(12) United States Patent
Ito et al.

(10) Patent No.: US 9,025,420 B1
(45) Date of Patent: May 5, 2015

(54) SELF-CONTROLLED LASER PULSING FOR THERMALLY ASSISTED RECORDING

(71) Applicant: HGST Netherlands B.V., Amsterdam (NL)

(72) Inventors: Naoto Ito, Kanagawa (JP); Michiya Kazusawa, Kanagawa (JP); Hiroyasu Tanabe, Kanagawa (JP); Sarbanoo Das, Kanagawa (JP); Hideki Zaitsu, Kanagawa (JP)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/081,651

(22) Filed: Nov. 15, 2013

(51) Int. Cl.
*G11B 13/08* (2006.01)
*G11B 5/09* (2006.01)
*G11B 5/00* (2006.01)

(52) U.S. Cl.
CPC .......... *G11B 5/09* (2013.01); *G11B 2005/0021* (2013.01)

(58) Field of Classification Search
CPC ............... G11B 2005/0021; G11B 2005/0026; G11B 13/08; G11B 13/04; G11B 5/314

USPC ........ 360/59; 369/13.02, 13.03, 13.24, 13.14, 369/13.22, 13.26, 13.32
See application file for complete search history.

(56) References Cited

U.S. PATENT DOCUMENTS

| | | | |
|---|---|---|---|
| 8,289,821 B1 * | 10/2012 | Huber ........................ | 369/30.03 |
| 8,315,128 B1 * | 11/2012 | Wilson et al. .............. | 369/13.02 |
| 8,565,047 B2 * | 10/2013 | Wilson ........................ | 369/13.02 |
| 8,565,048 B1 * | 10/2013 | Wilson et al. .............. | 369/13.26 |
| 8,891,341 B1 * | 11/2014 | Krichevsky et al. ........ | 369/13.33 |
| 2005/0286152 A1 * | 12/2005 | Fujii et al. ........................ | 360/51 |
| 2012/0243390 A1 * | 9/2012 | Lennard et al. ............ | 369/13.24 |
| 2012/0275279 A1 * | 11/2012 | Wilson et al. .............. | 369/13.24 |
| 2012/0300599 A1 * | 11/2012 | Contreras et al. .......... | 369/13.24 |
| 2013/0201805 A1 * | 8/2013 | Seigler et al. .............. | 369/13.24 |

* cited by examiner

*Primary Examiner* — Thomas Alunkal

(57) ABSTRACT

A method of storing data includes providing a write signal for a write head of a hard disk drive, generating a transition pulse signal derived from the write signal using a transition pulse generator, and generating a logic signal to drive a thermal source associated with the write head of the hard disk drive. The logic signal includes the logical summation of a cyclical base pulse signal and the transition pulse signal.

19 Claims, 8 Drawing Sheets

SELF-CONTROLLED LASER PULSING FOR THERMALLY ASSISTED RECORDING

FIELD OF THE DISCLOSURE

This disclosure, in general, relates to systems and methods for self-controlled laser pulsing for thermally assisted recordings.

BACKGROUND

Thermally-assisted magnetic recording systems are receiving attention as a technology suitable for the next generation of high-density hard disk drives. Thermally-assisted magnetic recording is based on directing light onto a media to raise the temperature of the media. A laser diode provided in the head serves as a light source. High-frequency laser modulation stabilizes the emission intensity of a laser diode.

Methods of high-frequency laser modulation include a method comprising the use of a self-pulsating laser diode and a method based on drive current modulation. The former, which is suitable for use with optical recording technologies, such as compact disks and digital video discs, affords an internal laser diode modulation of several hundred MHz even when drive is based on the use of a direct current laser diode. However, this method is not suitable for use with hard disk drives because the bandwidths used by the hard disk drives reach several GHz. Accordingly, a system based on drive current modulation is used therewith.

In systems based on drive current modulation, a prescribed temperature of the media is established when bit switching occurs. Otherwise, displacement of the boundary position between one bit and another bit occurs accompanying a large change in the hot spot on the media. Accordingly, for systems based on drive current modulation, a data-synchronized laser current pulse is generated.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

In an exemplary embodiment, a thermally assisted magnetic recording system includes a radiation source, such as a laser diode or resistive heater, in a magnetic recording device. The radiation source is driven by a logic signal derived from the logical summation of a base pulse signal and a transition pulse signal. The transition pulse signal can be derived from a write signal. In particular, a preamplifier of the system internally produces the logic signal on the basis of write data and can optionally operate without an external input of a laser pulse clock signal to the preamplifier. In an example, a cyclically generated base pulse signal and a transition pulse signal generated in response to edges of write signal is produced in a laser drive circuit of the preamplifier. A laser current signal is generated on the basis of the laser logic signal formed by the logical summation (OR) of the base pulse signal and the transition pulse signals. In particular, when the laser current is pulsed, constant flow of the laser current when bit switching occurs is possible. While the terms laser logic signal and laser current signal are used herein, the signals can be equally applied to other radiation heat sources, such as resistive heaters.

Figure 1:
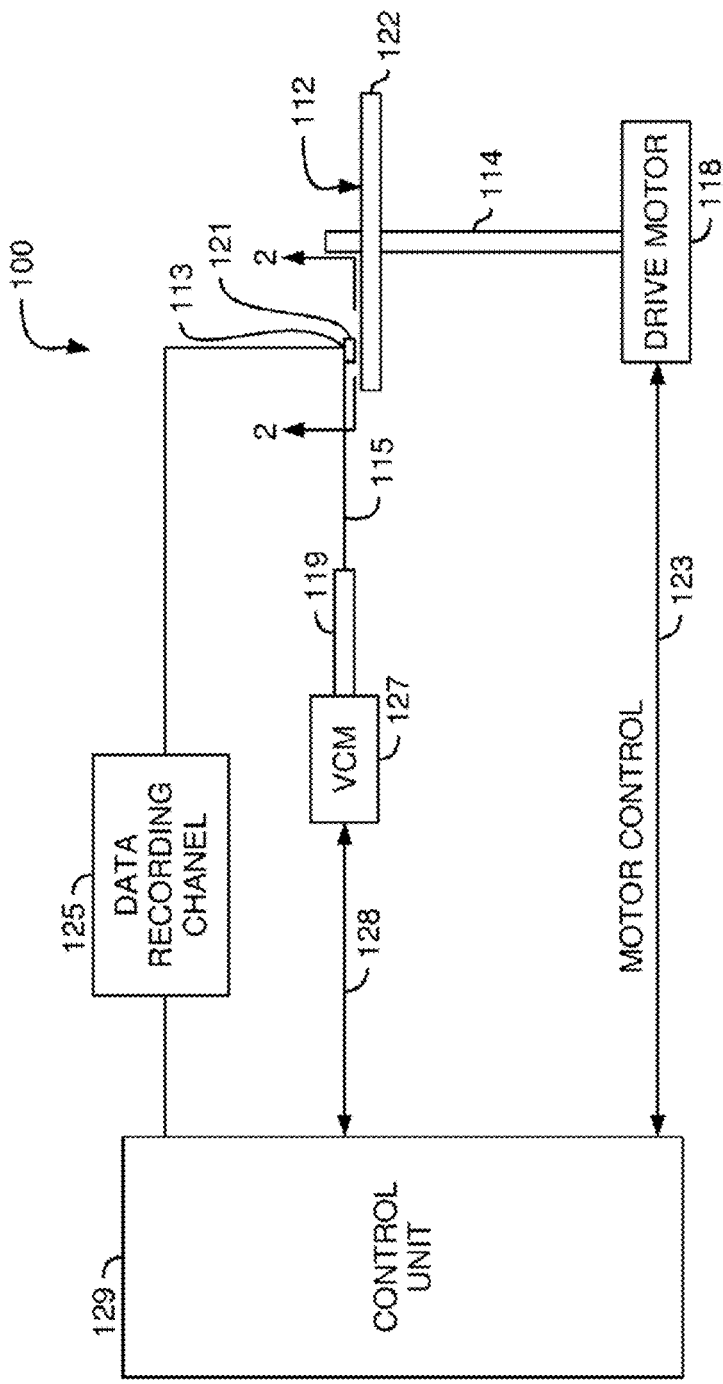
FIG. 1 includes an illustration of an exemplary hard disk drive.

FIG. 1 illustrates a disk drive 100. At least one rotatable magnetic disk 112 is supported on a spindle 114 and rotated by a disk drive motor 118. In an example, the magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121 that may include a radiation source (e.g., a laser or electrically resistive heater) for heating the disk surface 122. As the magnetic disk rotates, the slider 113 moves radially in and out over the disk surface 122 so that the magnetic head assembly 121 can access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by control unit 129.

During operation of a TAR or HAMR enabled disk storage system, the rotation of the magnetic disk 112 generates an air bearing between the slider 113 and the disk surface 122 which exerts an upward force or lift on the slider 113. The air bearing thus counter-balances the slight spring force of suspension 115 and supports slider 113 off and slightly above the disk 112 surface by a small, substantially constant spacing during normal operation. The radiation source heats up the high-coercivity data bits so that the write elements of the magnetic head assemblies 121 can correctly magnetize the data bits.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

The above description of a typical magnetic disk storage system and the accompanying illustration of FIG. 1 are for representation purposes only. It should be apparent that disk storage systems may contain a large number of disks and actuators, and each actuator may support a number of sliders.

Figure 2:
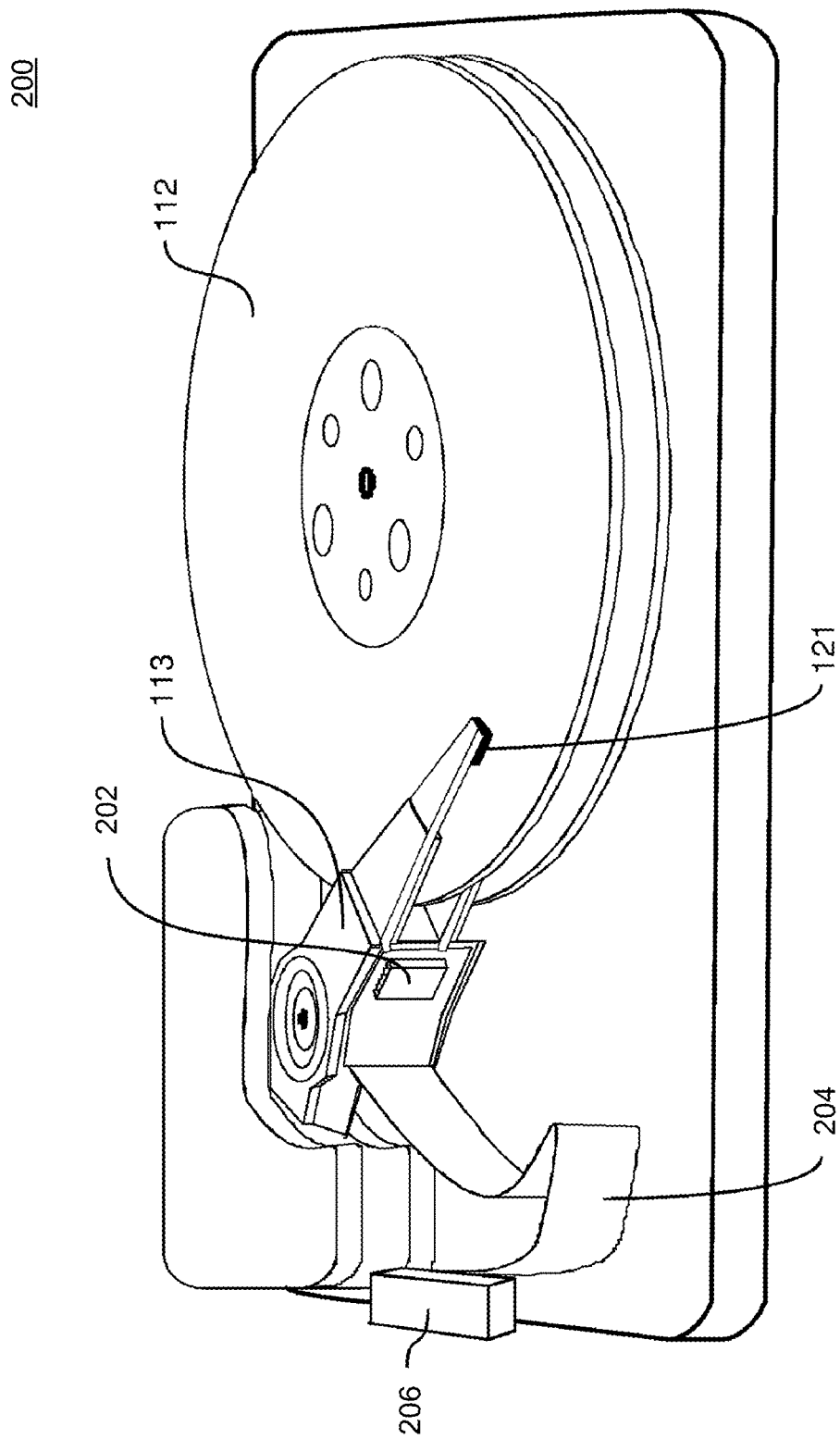
FIG. 2 includes a diagram of an exemplary hard disk drive.

FIG. 2 is a diagram of a hard drive. The hard drive 200 includes many of the same features found in the hard drive 100 of FIG. 1, such as a magnetic disk with a magnetic disk surface 112, magnetic write head assemblies 121 and a slider 113 for positioning the write head 121 over a particular data track. The hard drive 200 also includes a channel 206 coupled to a read/write circuit 202 by a channel interconnect 204. In one embodiment, the channel 206 is an independent integrated circuit with separate inputs and outputs. In another embodiment, the channel 206 can be part of larger integrated circuit such as a disk electronic card or a system on a chip (SOC). That is, the channel 206 can be only one part of a SOC where the SOC controls other functions of the hard drive 200.

The channel interconnect 204 is a cable, consisting of one or more wire, that transfers data between the channel 206 and the read/write circuit 202. The read/write circuit 202 is an integrated circuit that can send the write and laser signals to the write head assemblies 121. Moreover, the read/write circuit 202 can read already stored data from the magnetic disk surface 112 and transmit the data to the channel 206.

Figure 3:
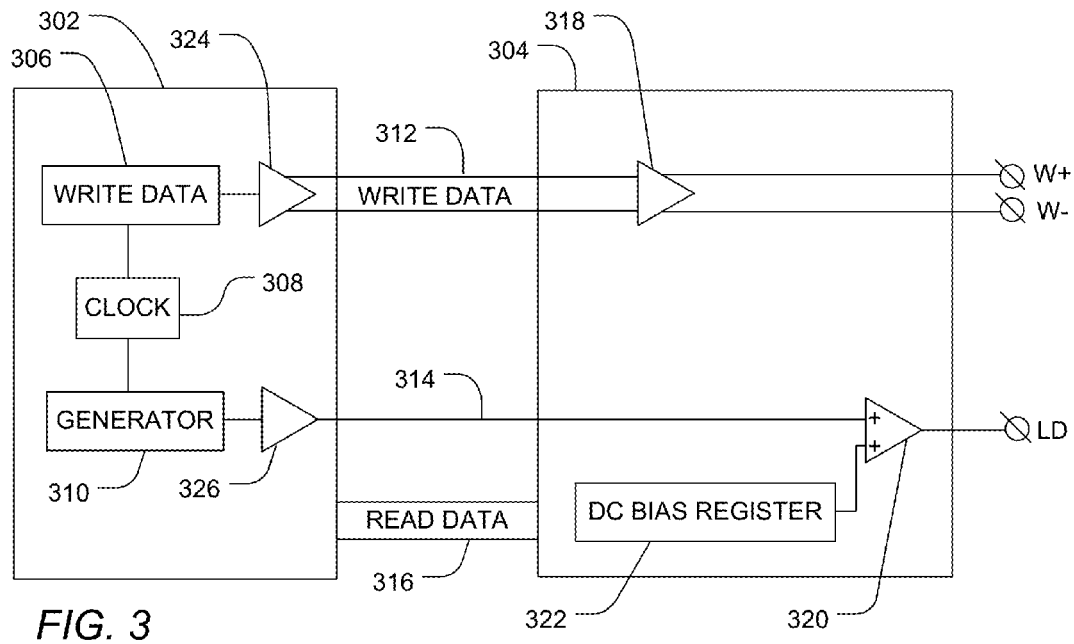
FIG. 3 includes a block diagram of an exemplary hard disk drive.

As illustrated in FIG. 3, a controller 302 includes write data and precomposition circuitry 306 and an amplifier 324 which generate a write data signal at 312 provided to a read/write circuit or preamplifier 304. The controller 302 also includes a pulse generator 310 and amplifier 326 which generate a laser clock signal 314 is also provided to the preamplifier 304. A clock 308 can be used to synchronize or maintained phase parity between the write signal 312 and the laser pulse signal 314. Read data 316 may be transferred from the read/write circuitry or preamplifier 304 back to the controller 302.

Within the read/write circuitry or preamplifier 304, an amplifier 318 provides a write signal to the write coil of a write head associated with the disk drive. The pulse signal 314 acts as a write data synchronized clock signal input to the preamplifier 304. In conjunction with a direct current (DC) bias and shaping register, the pulse signal 314 through adder 320 generates a laser current signal provided to a radiation source associated with the write head. While the discussion herein generally refers to the current sources and signals provided to the radiation source as a laser pulse signal or laser current signal, it is understood that such signals and current signals can be provided to devices other than laser diodes for generating thermal energy for use in conjunction with a thermally assisted magnetic recording system.

Figure 4:
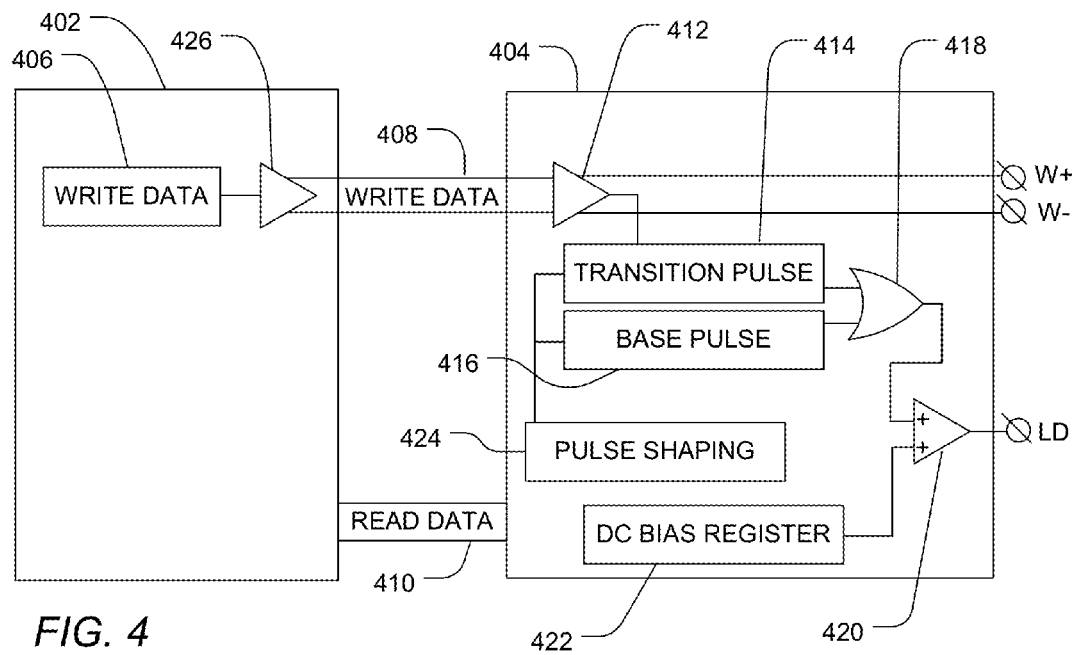
FIG. 4 includes a block diagram of an exemplary hard disk drive.

In contrast to the system of FIG. 3, a laser pulse signal or laser current signal can be generated without transmission of a laser clock signal from a controller to the preamplifier 304. For example, FIG. 4 illustrates a controller 402 including a write data and precomposition circuitry 406 and amplifier 426, which generate write data 408 provided to a read/write circuit or preamplifier 404. The read/write circuit or preamplifier 404 can provide read data 410 to the controller 402. The write data 408 is provided to an amplifier 412 and to a transition pulse generator 414, which generates a transition pulse signal. The transition pulse signal can have a specified pulse width. A base pulse generator 416 generates a base pulse signal. For example, the base pulse generator can generate a cyclical pulse having a desired frequency, pulse width, or pulse interval. A transition pulse signal and the base pulse signal can be logically summed (OR) by the logic circuit (OR) 418 to provide a laser logic signal to an adder 420, which provides a laser current signal.

A pulse shaping register 424 can specify the pulse width of the transition pulse or characteristics of the base pulse signal, such as frequency, pulse width, and pulse interval. Optionally, a direct current bias derived from the direct current bias register 422 can be used by the adder 420 generating the laser current signal.

Figure 5:
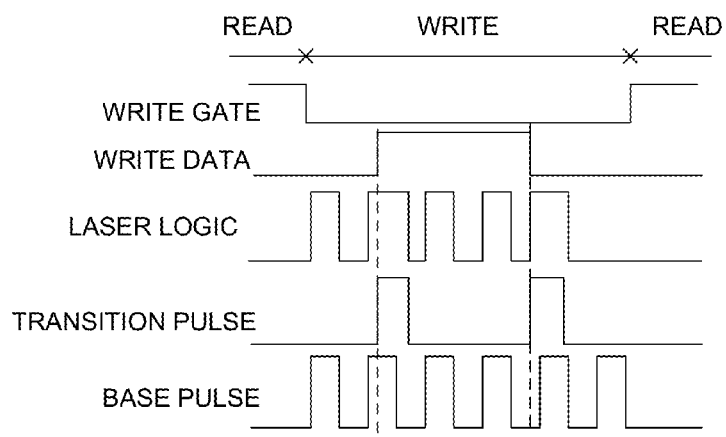
FIG. 5 includes an illustration of exemplary write data and laser logic signals.

FIG. 5 illustrates exemplary signals for writing data to a thermally assisted recording medium. For example, the write gate signal prepares a device to receive write data to write to the recording medium. The write data signal provides the write data to be recorded on the recording medium. A base pulse signal and a transition pulse signal are logically summed (OR) to provide a laser logic signal to drive a laser current signal to drive a laser diode or other heat source to provide thermal assistance to the write operation.

Figure 6:
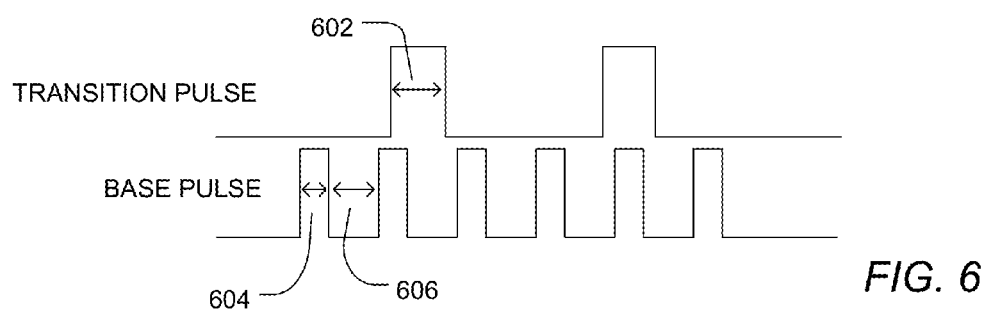
FIG. 6 includes an illustration of exemplary transition pulse and base pulse signals.

The transition pulse signal is generated based on edges associated with the write data signal. The transition pulse signal has a transition pulse width 602 as illustrated in FIG. 6. The base pulse has a pulse width 604 and a base pulse interval 606. The logical summation (OR) of the transition pulse signal and the base pulse signal provides a laser logic signal illustrated in FIG. 5 or FIG. 7. The transition pulse width 602, base pulse frequency, pulse width 604 and pulse interval 606 can be modified to provide the desired laser logic signal. In addition, a phase locked loop can be applied to the base pulse to establish write data synchronization.

Figure 7:
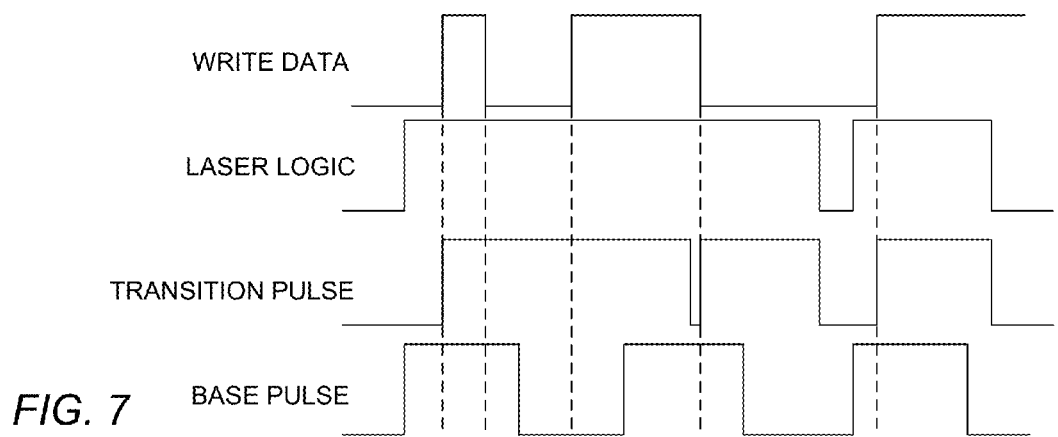
FIG. 7, FIG. 8, FIG. 9, FIG. 10, and FIG. 11 include illustrations of exemplary base pulse signals, transition pulse signals, and laser logic signals FIG. 12 includes a block diagram of an exemplary hard disk drive.

The base pulse width or the transition pulse width can be shorter than a write data bit. Alternatively, one or both of the base pulse width or the transition pulse width can be longer than a write data bit. Even with a base pulse width or transition pulse width greater than a bit width of the write data, short bits can result in a constant laser on state and bits above a certain length can provide several locations in which the laser is off, as illustrated in FIG. 7.

Figure 8:
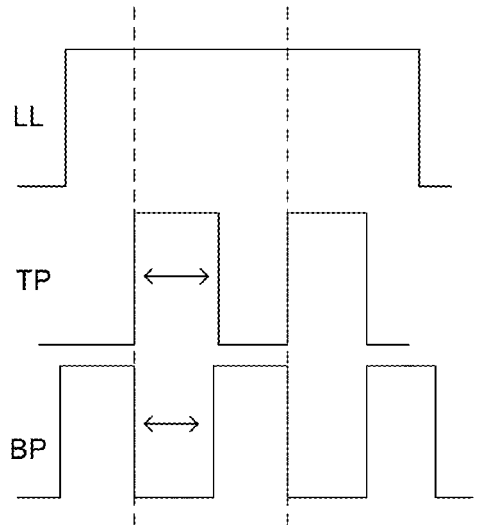
Figure 9:
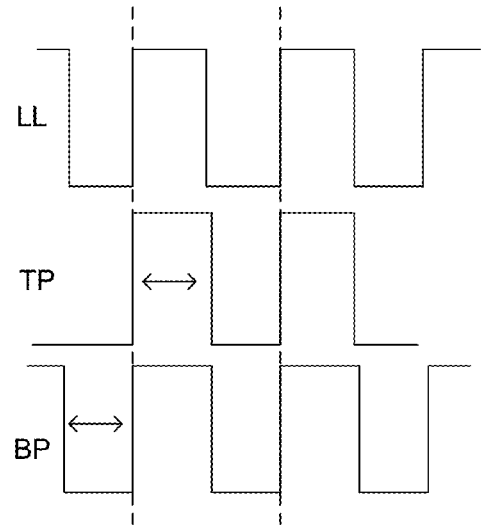

In an example, a base pulse interval is less than the transition pulse width. In another example, the transition pulse width can be less than the base pulse interval. FIG. 8 and FIG. 9 illustrates a laser logic signal resulting from transition and base pulse signals in which the transition pulse width is greater than the base pulse interval. For example, FIG. 8 illustrates a case where the transition pulse aligns with the base pulse interval. FIG. 9 illustrates a case in which the base pulse aligns with the transition pulse. While the pulse signals may be selected to correspond with the signals illustrated in FIG. 8 or FIG. 9, an absence of phase locking or in the presence of phase drift, the laser logic signal generated can drift between the case illustrated in FIG. 8 and the case illustrated in FIG. 9.

Figure 10:
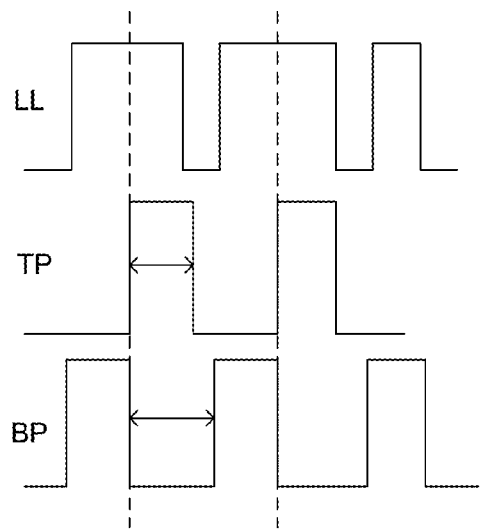
Figure 11:
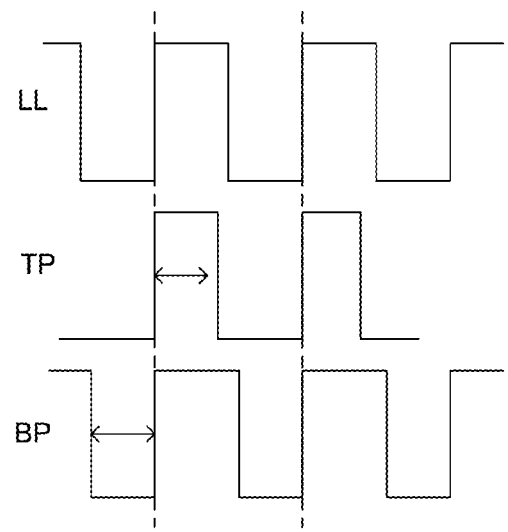

In another example, FIG. 10 and FIG. 11 illustrate a laser logic signal resulting from a transition pulse width that is less than a base pulse interval. FIG. 10 illustrates the laser logic signal resulting when the transition pulse aligns with the base pulse interval. FIG. 11 illustrates a case where the base pulse and transition pulse are aligned. As with FIG. 8 and FIG. 9, the generated laser logic signal may drift between the cases illustrated in FIG. 10 and FIG. 11 when phase drift exists between the base pulse signal in the transition pulse signal.

Alternatively, the base pulse can be phase locked with the write signal, resulting in phase synchronization between the transition pulse signal and the base pulse signal. Optionally, the timing of the base pulse signal can be offset from the transition pulse with a constant difference. In such a case, a laser logic signal pattern can be established similar to those to those illustrated in FIG. 8, FIG. 9, FIG. 10, or FIG. 11 or a variation thereof including an offset of one or both of the transition pulse and base pulse signals, and can be maintained over time.

Figure 12:
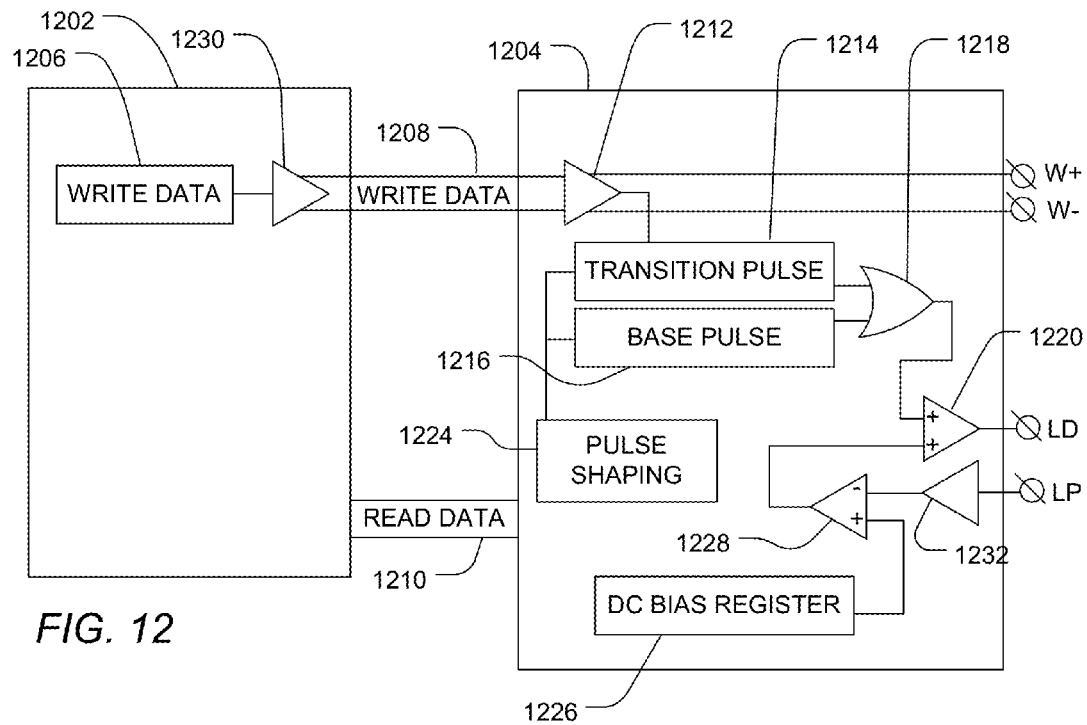

In an alternative embodiment, the laser current signal can be biased based on feedback from the sensor associated with the write head or with a recording medium. For example, as illustrated in FIG. 12, a control circuit 1202 includes a write data and precomposition circuit 1206 and amplifier 1230 providing write data 1208 to the read/write circuit or preamplifier 1204. Optionally, the read/write circuit or preamplifier 1204 provides read data 1210 to the controller 1202. The write data 1208 is received by an amplifier 1212, which provides a current signal to the write coils of the write head associated with the recording media. As above, a transition pulse generator 1214 generates a transition pulse based on edges of the write data signal. A base pulse generator 1216 generates a cyclical base pulse signal. The base pulse signal and the transition pulse signal are logically summed (OR) using logical circuit 1218 to provide a laser logic signal. The laser logic signal is provided to an adder 1220 resulting in a laser current signal sent to a radiation source associated with the write head. Optionally, the base pulse generator 1216 has an associated phase locking circuitry, such as a phase lock loop, to synchronize the phase of the base pulse signal with that of the write signal.

The characteristics of the transition pulse signal and base pulse signal, such as the transition pulse width, the base pulse width, the base pulse interval, or any offset can be driven by the pulse shaping register settings 1224. The settings relating to pulse or interval width or offset can be adjustable. A manufacturer or technician can adjust the settings stored in the base pulse register settings 1224 or the DC bias register 1226 to provide a desired characteristic of the logic signal. Similarly, the settings relating to a delay of the write signal can be adjustable and can be adjusted by a manufacturer or technician.

The laser current signal can be further biased by feedback from sensors associated with the laser, write head or recording medium. For example, the sensor signal can be received by an amplifier 1232 and provided to circuit 1228, which biases the signal from the DC bias/shaping register 1226, which is provided to the adder 1220. The adder 1220 generates the laser current signal based on the biased laser logic signal. As such, the laser current signal can be modified based on feedback from sensor. Alternatively, the pulse height can be altered based on the length of prior pulse signals. In a particular example, the preamplifier implements overshoot functionality that provides laser current signals that change shape in response to a time interval with the current signal.

Figure 13:
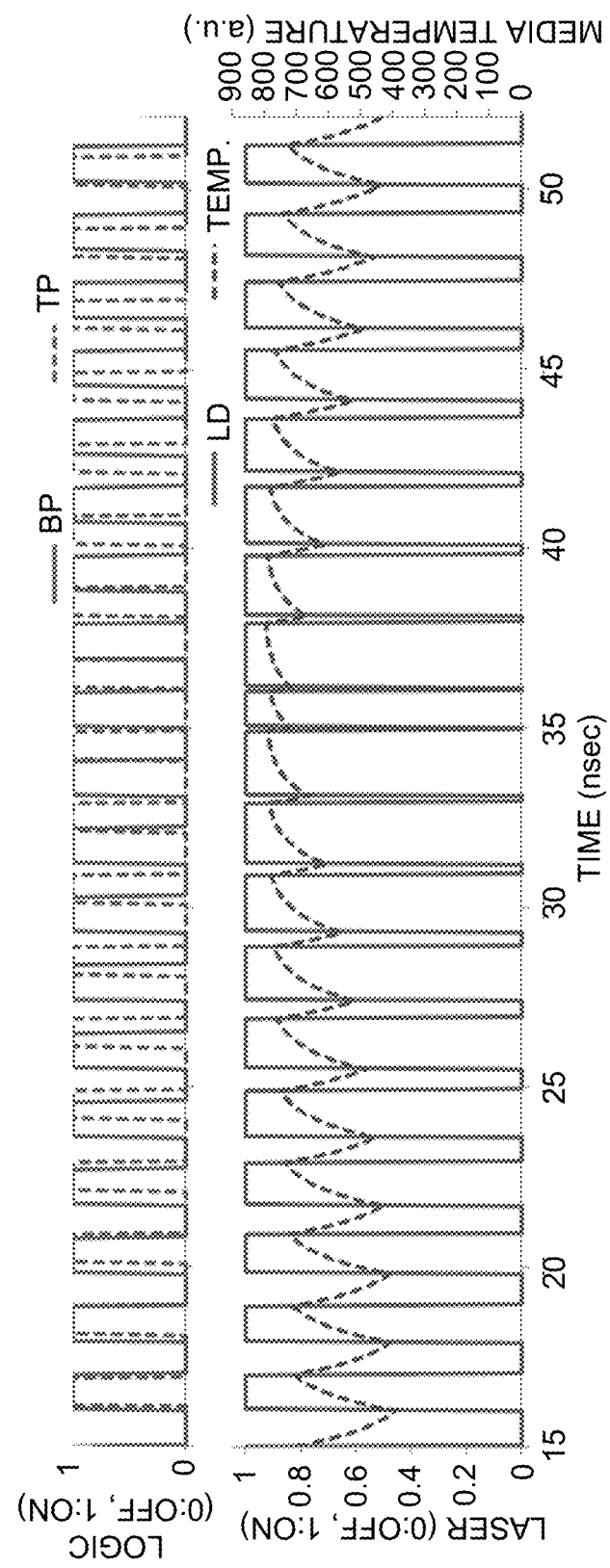
FIG. 13 and FIG. 14 include illustrations of exemplary temperature performance resulting from a laser logic signal.
Figure 14:
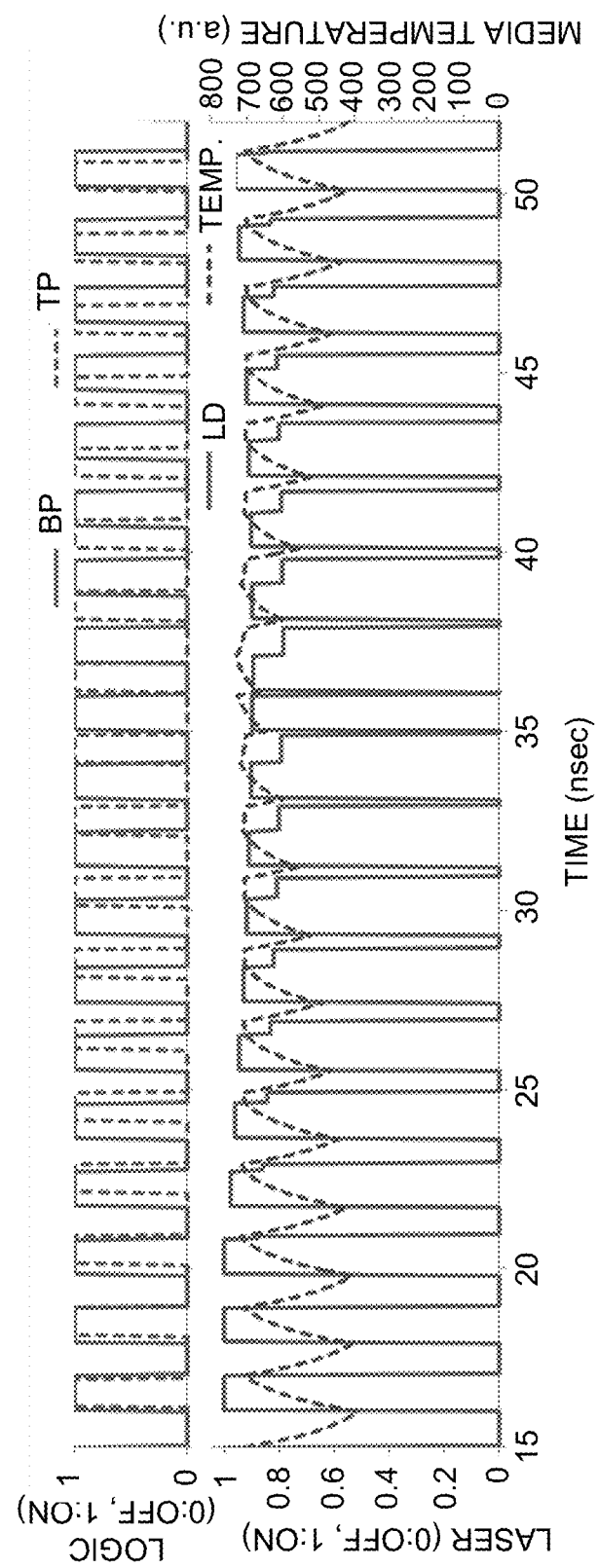

For example, FIG. 13 illustrates a temperature of the recording media resulting from a logic circuit having phase shift. In contrast, FIG. 14 illustrates the temperature experienced by the recording media in response to a logic circuit having phase shift with overshoot adjustment. When the time to reach the saturation temperature of the media is long, saturation is not reached during the transition pulse. In this case, when the phases of the transition pulse and base pulse shift, the length of each pulse of the laser logic signal changes, resulting in variations in the temperature reached by the media (e.g., as illustrated in FIG. 13). To alleviate variations, overshoot can be applied to the laser pulse current (e.g., as illustrated in FIG. 14). The height of the overshoot changes in response to a time interval with the directly preceding pulse. As a result, irrespective of the phases of the transition pulse and the base pulse, the temperature reached by the media as a result of each pulse can be caused to approach a constant temperature. The length of the base pulse can be longer than the length of the transition pulse. The interval of the base pulse can be shorter than the hot spot length on the media pulse to afford pulse recording-based long bit writing. As illustrated in FIG. 14, the peak temperature, even during suboptimal phase shifting, is less than peak temperature without overshoot adjustment as illustrated in FIG. 13.

Figure 15:
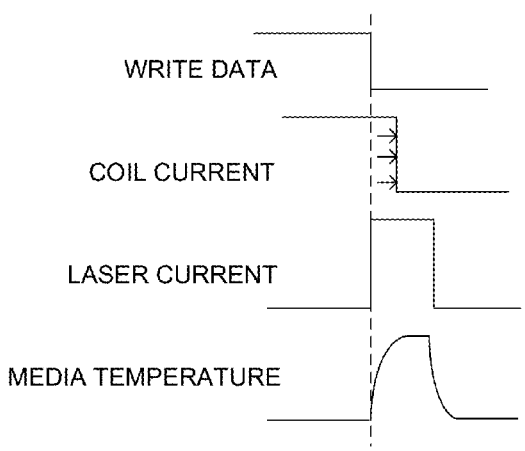
FIG. 15 includes an illustration of exemplary signals including a coil current signal.

In general, the recording media temperature is responsive to radiation driven by the laser current signal. However, in particular situations wherein media temperature is slow to respond to radiation driven by the laser current signal, the write data signal may be delayed when transferred to coil current, as illustrated in FIG. 15. In such an example, a delay circuit can be implemented before or after an amplifier providing the write current to the write coil of a write head. In particular, the time to raise the temperature of a media is not to be disregarded, the polarity of the coil current can be switched after the temperature of the media has reached a prescribed temperature by delaying the phase of the write current (or the laser pulse current) with respect to the write data by a fixed time period.

In an example, when the time to reach the saturation temperature of the media is sufficiently short, a transition pulse longer than this time can be used. The phase of the coil current with respect to the write data is adjusted so that the polarity of the coil current switches after the saturation temperature of the media has been reached. The length of the base pulse can be set so as to be equivalent to or longer than the time taken to reach the saturation temperature of the media. The interval of the base pulse can be set shorter than the hot spot length on the media pulse to afford pulse recording-based long bit writing.

In particular, the above system advantageously can be implemented using standard interconnects between hard drive circuit components. Embodiments do not utilize additional clock signal lines, which would lead to changes in the interfaces and interconnects between components. In particular, a preamplifier is able to generate a laser pulse in the absence of an external input of a clock signal.

In a first aspect, a method of storing data includes providing a write signal for a write head of a hard disk drive, generating a transition pulse signal derived from the write signal using a transition pulse generator, and generating a logic signal to drive a thermal source associated with the write head of the hard disk drive, the logic signal comprising the logical summation of a cyclical base pulse signal and the transition pulse signal.

In an example of the first aspect, the write signal is provided to a preamplifier of a hard drive system, and the preamplifier of the hard drive system includes the transition pulse generator.

In another example of the first aspect and the above examples, the method further includes generating the base pulse signal with a base pulse generator. For example, a preamplifier of a hard drive system includes the base pulse generator. In another example, generating the base pulse signal includes generating the base pulse signal in the absence of an external pulse signal. In a further example, generating the base pulse signal includes generating the base pulse in accordance with a pulse shaping register. For example, the pulse shaping register settings are adjustable to adjust one or more of a base pulse width, a base pulse interval, a transition pulse width, or an offset.

In a further example of the first aspect and the above examples, the method further includes phase locking the base pulse signal relative to the write signal.

In an additional example of the first aspect and the above examples, the method further includes generating a current signal based on the logic signal with a direct current (DC) bias circuitry receiving as input the logic signal. For example, the DC bias circuitry further receives as input a bias signal from a bias register. In particular, the method can further include receiving a sensor signal and adjusting the bias signal based on the sensor signal.

In another example of the first aspect and the above examples, the method further includes applying a delay to the write logic signal.

In a further example of the first aspect and the above examples, a transition pulse of the transition pulse signal is greater than an interval of the base pulse signal.

In a second aspect, a preamplifier includes an input to receive a write signal; a transition pulse generator to generate a transition pulse signal based on the write signal; a base pulse generator to generate a cyclical base pulse signal; a summation circuitry to generate a logic signal based on the logical summation of the transition pulse signal and the base pulse signal; and a drive amplifier to receive the logic signal and to provide a current signal based on the logic signal to a thermal source associated with a write head.

In an example of the second aspect, the preamplifier further includes a phase lock circuitry associated with the base pulse generator to phase lock the base pulse signal to the write signal.

In another example of the second aspect and the above examples, the preamplifier further includes a direct current bias circuitry disposed in communication between the summation circuitry and the drive amplifier, the direct current bias circuitry to bias the current signal, and a bias register connected to the direct current bias circuitry. For example, the preamplifier can further include a sensor input to receive a sensor signal and a sensor bias circuitry in communication between the bias register and the direct current bias circuitry to bias further bias the laser pulse signal based on the sensor signal.

In a further example of the second aspect and the above examples, the preamplifier further includes a pulse shape register in communication with the base pulse generator, the pulse shape register storing settings associated with adjustable base pulse width, base pulse interval, transition pulse width, or an offset.

In an additional example of the second aspect and the above examples, the preamplifier further includes a delay circuit in communication with the input to receive the write signal.

In a further example of the second aspect and the above examples, the preamplifier further includes overshoot functionality wherein a shape of a current signal changes in response to a time interval with the current signal.

In a third aspect, a hard drive system includes a drive medium; a write head associated with the drive medium, the write head associated with a thermal source; a control circuit including a write data generator to generate a write signal; and a preamplifier in communication with the control circuit. The preamplifier includes an input to receive a write signal; a transition pulse generator to generate a transition pulse signal based on the write signal; a base pulse generator to generate a cyclical base pulse signal; a summation circuitry to generate a logic signal based on the logical summation of the transition pulse signal and the base pulse signal; and a drive amplifier to receive the logic signal and to provide a current signal based on the logic signal to a thermal source associated with a write head.

Examples of the third aspect can include features of the examples of the first or second aspects. As will be recognized by those of skill in the art, features of the above aspects and examples of aspects can be combined to form different embodiments.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A method of storing data, the method comprising:
    providing a write signal for a write head of a hard disk drive;
    generating a transition pulse signal derived from the write signal using a transition pulse generator;
    configuring a pulse shaping register to store the characteristics of a cyclical base pulse signal, comprising the frequency, pulse width and pulse interval; and
    generating a logic signal to drive a thermal source associated with the write head of the hard disk drive, the logic signal comprising the logical summation of the cyclical base pulse signal and the transition pulse signal; wherein the characteristics of the base pulse signal are controlled by the pulse shaping register.

2. The method of claim 1, wherein the write signal is provided to a preamplifier of the hard disk drive system and wherein the preamplifier of the hard disk drive system includes the transition pulse generator; and wherein a preamplifier of the hard disk drive includes a base pulse generator, configured to generate a base pulse signal in the absence of an external pulse signal and in accordance with a pulse shaping register.

3. The method of claim 1, further comprising generating the base pulse signal with a base pulse generator.

4. The method of claim 3, wherein a preamplifier of a hard drive system includes the base pulse generator.

5. The method of claim 3, wherein generating the base pulse signal includes generating the base pulse signal in the absence of an external pulse signal.

6. The method of claim 1, further comprising phase locking the base pulse signal relative to the write signal.

7. The method of claim 1, further comprising generating a current signal based on the logic signal with a direct current (DC) bias circuitry receiving as input the logic signal.

8. The method of claim 7, wherein the DC bias circuitry further receives as input a bias signal from a bias register.

9. The method of claim 8, further comprising receiving a sensor signal and adjusting the bias signal based on the sensor signal.

10. The method of claim 1, further comprising applying a delay to the write logic signal.

11. The method of claim 1, wherein a transition pulse of the transition pulse signal is greater than an interval of the base pulse signal.

12. A preamplifier comprising:
an input to receive a write signal;
a transition pulse generator to generate a transition pulse signal based on the write signal;
a pulse shaping register to store the characteristics of a base pulse signal, comprising the frequency, pulse width and pulse interval;
a base pulse generator to generate the cyclical base pulse signal, wherein the characteristics of the cyclical base pulse signal are controlled by the pulse shaping register;
a summation circuitry to generate a logic signal based on the logical summation of the transition pulse signal and the base pulse signal; and
a drive amplifier to receive the logic signal and to provide a current signal based on the logic signal to a thermal source associated with a write head.

13. The preamplifier of claim 12, further comprising a phase lock circuitry associated with the base pulse generator to phase lock the base pulse signal to the write signal.

14. The preamplifier of claim 12, further comprising a direct current bias circuitry disposed in communication between the summation circuitry and the drive amplifier, the direct current bias circuitry to bias the current signal, and a bias register connected to the direct current bias circuitry.

15. The preamplifier of claim 14, further comprising a sensor input to receive a sensor signal and a sensor bias circuitry in communication between the bias register and the direct current bias circuitry to bias further bias the laser pulse signal based on the sensor signal.

16. The preamplifier of claim 12, further comprising a pulse shape register in communication with the base pulse generator, the pulse shape register storing settings associated with adjustable base pulse width, base pulse interval, transition pulse width, or an offset.

17. The preamplifier of claim 12, further comprising a delay circuit in communication with the input to receive the write signal.

18. The preamplifier of claim 12, further comprising overshoot functionality wherein a shape of a current signal changes in response to a time interval with the current signal.

19. A hard drive system comprising:
a drive medium;
a write head associated with the drive medium, the write head associated with a thermal source;
a control circuit including a write data generator to generate a write signal; and
a preamplifier in communication with the control circuit, the preamplifier comprising:
an input to receive a write signal;
a transition pulse generator to generate a transition pulse signal based on the write signal;
a pulse shaping register to store the characteristics of a base pulse signal, comprising the frequency, pulse width and pulse interval;
a base pulse generator to generate the cyclical base pulse signal, wherein the characteristics of the cyclical base pulse signal are controlled by the pulse shaping register;
a summation circuitry to generate a logic signal based on the logical summation of the transition pulse signal and the base pulse signal; and
a drive amplifier to receive the logic signal and to provide a current signal based on the logic signal to a thermal source associated with a write head.

* * * * *